(12) United States Patent
Aragon et al.

(10) Patent No.: US 12,340,619 B2
(45) Date of Patent: Jun. 24, 2025

(54) LIVELINESS DETECTION USING A DEVICE COMPRISING AN ILLUMINATION SOURCE

(71) Applicant: Identy Inc., Dover, DE (US)

(72) Inventors: Jesus Aragon, Dover, DE (US); Hardik Gupta, Dover, DE (US)

(73) Assignee: Identy Inc., Dover, DE (US)

( * ) Notice: Subject to any disclaimer, the term of this patent is extended or adjusted under 35 U.S.C. 154(b) by 364 days.

(21) Appl. No.: 17/917,467

(22) PCT Filed: Apr. 9, 2021

(86) PCT No.: PCT/EP2021/059332
§ 371 (c)(1),
(2) Date: Oct. 6, 2022

(87) PCT Pub. No.: WO2021/205016
PCT Pub. Date: Oct. 14, 2021

(65) Prior Publication Data
US 2023/0162534 A1 May 25, 2023

(30) Foreign Application Priority Data
Apr. 9, 2020 (EP) ..................................... 20382290

(51) Int. Cl.
*G06V 40/12* (2022.01)
*G06V 10/141* (2022.01)
(Continued)

(52) U.S. Cl.
CPC ........ *G06V 40/1388* (2022.01); *G06V 10/141* (2022.01); *G06V 10/507* (2022.01);
(Continued)

(58) Field of Classification Search
CPC ........... G06V 40/1388; G06V 40/1394; G06V 40/45; G06V 10/141; G06V 10/507; G06V 10/56; G06V 10/60; G06V 10/82
See application file for complete search history.

(56) References Cited

U.S. PATENT DOCUMENTS 6,292,576 B1 * 9/2001 Brownlee .............. G06V 40/12
340/5.83
10,671,870 B2 * 6/2020 Ma .......................... G06V 40/40
(Continued)

FOREIGN PATENT DOCUMENTS

JP 2020501264 A 1/2020
WO 2021205016 A1 10/2021

OTHER PUBLICATIONS

Chan et al., Face Liveness Detection using a flash against 2d spoofing attack (Year: 2017).*
(Continued)

*Primary Examiner* — John B Strege
(74) *Attorney, Agent, or Firm* — Lowenstein Sandler LLP (57) ABSTRACT

A computer-implemented method for identifying a user uses a computing device comprising an illumination source that, when activated, emits visible light, the method comprising taking two images of a scene potentially comprising a living body part carrying a biometric characteristic, wherein a first image is taken without the illumination source activated and the second image is taken with the illumination source activated, transferring the first image and the second image to a neural network and processing, by the neural network the first image and the second image, by comparing the first image and the second image, thereby determining whether the first image and the second image are of the living body part, and, if it is determined that the first image and the second image are of the living body part, performing an
(Continued)

identification algorithm to find a biometric characteristic for identifying the user.

19 Claims, 5 Drawing Sheets

(51) Int. Cl.
*G06V 10/50* (2022.01)
*G06V 10/56* (2022.01)
*G06V 10/60* (2022.01)
*G06V 10/82* (2022.01)
*G06V 40/40* (2022.01)

(52) U.S. Cl.
CPC .............. *G06V 10/56* (2022.01); *G06V 10/60* (2022.01); *G06V 10/82* (2022.01); *G06V 40/1394* (2022.01); *G06V 40/45* (2022.01)

(56) References Cited

U.S. PATENT DOCUMENTS

| | | | |
|---|---|---|---|
| 11,721,120 B1* | 8/2023 | Parthe | G06V 40/60 |
| 2014/0068740 A1* | 3/2014 | LeCun | H04L 63/0861 |
| | | | 726/7 |
| 2018/0165508 A1 | 6/2018 | Othman et al. | |
| 2019/0188509 A1 | 6/2019 | He et al. | |
| 2019/0303551 A1 | 10/2019 | Tussy | |
| 2021/0034893 A1 | 2/2021 | Ebihara | |
| 2021/0034894 A1* | 2/2021 | Ebihara | G06V 40/197 |
| 2021/0133424 A1* | 5/2021 | Sohn | G06V 40/1365 |
| 2023/0245502 A1* | 8/2023 | Li | G06V 10/25 |
| | | | 382/124 |
| 2023/0252283 A1* | 8/2023 | Lee | G06N 3/0464 |
| | | | 706/25 |

OTHER PUBLICATIONS

Extended European Search Report for European application No. EP 23 18 9541.8, mailed Oct. 30, 2023, 18 pages.

Japanese Office Action, dated Oct. 17, 2023 received for JP application No. 2022-561401, 10 pages. (with machine translation).

International Search Report and Written Opinion for Application No. PCT/EP2021/059332, mailed on Jun. 8, 2021, 6 pages.

Chaudhari et al., "Prevention of Spoof Attacks in Fingerprinting Using Histogram Features," 2012 Nirma University International Conference on Engineering, NUiCONE-2012, Dec. 6-8, 2012, 4 pages.

Soleymani et al., "Multi-Level Feature Abstraction from Convolutional Neural Networks for Multimodal Biometric Identification," Jul. 3, 2018, 8 pages.

Korean Office Action, dated Apr. 25, 2025 received for KR Application No. 10-2022-7036928, 8 pages.

* cited by examiner

LIVELINESS DETECTION USING A DEVICE COMPRISING AN ILLUMINATION SOURCE

RELATED APPLICATIONS

This patent application claims the benefit of International Application No. PCT/EP2021/059332, filed Apr. 9, 2021, which claims priority to EP Application No. 20382290.3, filed Apr. 9, 2020, wherein the entire contents of both are hereby incorporated by reference.

FIELD OF INVENTION

The present disclosure refers to a computer-implemented method for liveliness detection using a device comprising an illumination source.

BACKGROUND

Smartphones and other mobile computing devices have more and more part of the daily life. In view of this, it is also common nowadays to, for example, login into banking accounts using the smartphone or to pay in a restaurant with a smartphone.

In order to make it easier for the user to login to such accounts, some mobile computing devices may identify a user using a camera of, for example, the mobile computing device and may process the respective image obtained in order to identify the user by extracting biometric characteristics like a fingerprint.

However, it is necessary to ensure that the camera is not fooled by holding an image of the respective biometric characteristics (like the fingertip) in front of the camera and taking a photo of the same by a malicious attacker in order to obtain access to the respective sensitive information like the bank account.

DETAILED DESCRIPTION

An object of the present disclosure is to provide a method that allows for distinguishing between a living object and a spoof of that object.

A computer-implemented method for identifying a user according to embodiments of the present disclosure comprises using a computing device comprising an illumination source that, when activated, emits visible light, the method comprising taking two images of a scene potentially comprising a living body part carrying a biometric characteristic, wherein a first image is taken without the illumination source being activated and the second image is taken with the illumination source being activated, transferring the first image and the second image to a neural network and processing, by the neural network the first image and the second image, wherein the processing comprises comparing the first image and the second image, thereby determining whether the first image and the second image are images of a living body part, the method further comprising, if it is determined that the first image and the second image are images of a living body part, performing an identification algorithm to find a biometric characteristic for identifying the user and, if it is determined that the first image and the second image are not images of a living body part, not performing the identification algorithm.

An illumination source in the sense of the present disclosure may be considered to be, for example, the torchlight (i.e., flashlight) of a smartphone. However, the present disclosure is not limited in this regard and any illumination source that is part of a corresponding computing device is considered suitable as long as it can be selectively activated and emits visible light.

In this context, it is also clear that the second image is not only taken with the illumination source being activated but the scene from which the second image is taken (and specifically the object) is also illuminated with the illumination source.

The neural network can be any neural network that is preferably trained to perform the respective task according to the present disclosure. In this regard, embodiments may be preferred where the neural network is a convolution neural network that is specifically adapted for comparing the respective images. This means that it was correspondingly trained and also the network structure and architecture (for example the number of layers) is adapted to this task.

The identification algorithm can be any algorithm that is adapted to process image information such (irrespective of if this image information is taken from the first image or the second image) that it can separate or at least identify a biometric characteristic. For example, a cropping algorithm can be used here that separates a region of interest in the image, for example the portion or region of a fingertip from another part of the image.

It is a finding of the present disclosure that an image taken from a living body part like a finger without an illumination source being activated can be distinguished from a corresponding image being taken from the same body part with an additional illumination source, like a light (e.g., a flashlight) of a smartphone, being activated. This is because the different portions of visible light (i.e. different wavelengths) are reflected by living body parts differently. This means, for example, red light is emitted differently compared to blue light. By comparing such images, this difference can be determined and if no corresponding difference can be observed, it is very likely that the two images taken come from a spoof, like an image of the actual living body part being held in front of the camera when taking the images.

Thus, embodiments of the present disclosure can reliably distinguish between spoofs of objects and living objects without requiring additional components that are usually not available to a user of a smart phone.

In another embodiment, a computer-implemented method for identifying a user according to the present disclosure comprises using a device comprising an illumination source that, when activated, emits visible light, the method comprising taking two images of a scene potentially comprising a living body part carrying a biometric characteristic, wherein a first image is taken without the illumination source being activated and the second image is taken with the illumination source being activated, obtaining a difference image from the first image and the second image, transferring the difference image to a neural network and processing, by the neural network the difference image, wherein the processing comprises determining, from the difference image, brightness difference information and determining, from the brightness difference information, whether the first image and the second image are images of a living body part, and, if it is determined that the first image and the second image are images of a living body part, performing an identification algorithm to find a biometric characteristic for identifying the user and, if it is determined that the first image and the second image are not images of a living body part, not performing the identification algorithm.

The difference image may preferably be considered a pixel-wise difference image of the first image and the second image, meaning that preferably the brightness values and/or the color values of each pixel are taken from the first image and the second image and subtracted from each other, thereby obtaining new pixel values for color and brightness for each pixel in the first image and the second image. This "new" image is then considered as the difference image in the context of the present disclosure.

As already explained above, there is a difference in the reflection characteristic of light when an illumination source (e.g., a flashlight) is on or off for a living body part compared to a spoof of a living body part, like an image held in front of the camera. From the respective processing with a neural network, it can then be determined whether the difference image constitutes proof for the first and second image being taken from a living body part or a spoof.

This method has the advantage that it is not necessary to process both images by the neural network and perform a corresponding comparison but it is only necessary to process a single image that contains respective information.

In one embodiment, comparing the first image and the second image comprises comparing the images with respect to a pixel brightness distribution of the images.

As the brightness values obtained for the first and second image significantly differ for a living body part, this allows for an improved reliability in distinguishing between spoofs and living objects.

Further, comparing the images with respect to a pixel brightness distribution of the images can comprise obtaining red, blue and green median brightness values of the pixels of the first image and of the pixels of the second image and determining, if the median brightness value of the second image exceeds the median brightness values of the pixels of the first image by a predetermined threshold, that the images are images of a living body part.

This threshold can be a trained threshold that allows the neural network to identify and distinguish between spoofs and real (living) objects because, for example, the threshold can be set to an amount for which it is almost certain that the object must be a real object when exceeding (or not exceeding) the threshold.

In a more specific realization, the pixel brightness distribution for the red, blue and green pixels is obtained for the first image and the second image and the obtained pixel brightness distribution of each color of the first image is compared to the obtained pixel brightness distribution of the corresponding color of the second image.

By separating the brightness values for each of the colors and comparing them separately, a further increase in the reliability of the distinguishing between the real object and the spoof is possible.

It may also be provided that processing the images by the neural network comprises, before the comparing, identifying, using the neural network, a portion of the first image and/or the second image that is likely to contain a body part and extracting pixel information from the first and second image corresponding to this portion, wherein comparing the first and second image comprises comparing only the extracted pixel information from the first and second image corresponding to the portion.

This can likewise be applied to the method according to the second embodiment described above where, before calculating the difference image, the method of this embodiment is performed, i.e., by using the neural network, a portion of the first image and/or the second image that is likely to contain a body part is performed and pixel information from this portion is extracted from the first image and the second image in order to calculate the difference image. This reduces the amount of pixels that have to be processed and, thus, reduces the required computing resources without this having a negative impact on the reliability of the method.

In a further embodiment, before taking the first image and the second image, an illumination checking step is performed, the illumination checking step comprising checking the current illumination condition and, the method further comprising, if the brightness corresponding to the current illumination condition exceeds a given threshold, not performing the further steps of the method.

With this, it can be ensured that the liveliness detection can provide reliable results also in view of the environmental conditions. Thereby, false positive or false-negative identifications can be avoided.

More specifically, if the brightness corresponding to the current illumination condition exceeds a given threshold, presenting to the user an information that the identification cannot be performed under the current illumination condition.

This information can, for example, be indicative to the user that he or she should use another means for distinguishing between real objects and spoofs of such objects or can simply indicate that neither the liveliness detection nor the identification of the user using a biometric characteristic obtained from the first and/or second image can be performed. The first alternative allows for still performing the identification by employing another method while the second ensures that a false identification of a malicious user using a spoof of the living body part is not possible.

It can also be provided that each of the steps of the method is performed on a mobile computing device and wherein the neural network is completely installed on the mobile device.

This means that not only the images are taken on the mobile computing device but that also the further processing by the neural network and each subsequent step are performed on the mobile device. Thereby, a permanent connection to the mobile internet, for example, is not necessary which can be specifically advantageous in regions of the world where such mobile internet is not always available.

In a further embodiment the neural network comprises three sub-networks, wherein a first sub-network processes the first image to extract first information from the first image and a second sub-network processes the second image to extract second information from the second image, wherein a third sub-network compares the first information and the second information in order to determine whether the first image and the second image are images of a living body part.

This separation into the first, second and third sub-networks allows for specifically employing neural networks (in the form of the sub-networks) for the respective tasks in processing the images and obtaining a decision on whether or not the images taken show real objects or spoof of them.

Furthermore, in one embodiment, determining whether the first image and the second image are images of a living body part comprises deciding whether the first and second images are images of images on paper and/or whether the first and second images are images of images presented on a screen and/or whether the first and second images are images of 3D-spoofs of living body parts and/or whether the first and second images are images of living body parts.

Since, for example, images presented on paper to a camera show very specific characteristics when being illuminated and not being illuminated, it is possible for the neural network to make a corresponding decision, thereby not only deciding whether the image shows a real object or a spoof of the real object but also deciding which kind of spoof it actually is.

In one realization of the second embodiment, the brightness difference is obtained from a pixel-wise subtraction of brightness values of the first image and the second image when obtaining the difference image.

This pixel-wise subtraction can also be performed on a color-wise and pixel-wise subtraction, meaning that for each pixel and for each color value (green, blue and red) the brightness values obtained and the pixel-wise subtraction is performed. Thereby, specific and precise information is obtained on the actual characteristics of the first image and the second image and this precise information is used in the difference image.

In one embodiment the illumination source is a light (e.g., a flashlight) of the computing device.

As such illumination sources in the form of lights (e.g., flashlights) are provided for nowadays mobile computing devices like laptops, tablet PCs and smartphones, employing further devices is not necessary for performing the methods according to the present disclosure, making it easier for a user to apply the respective method.

Figure 1:
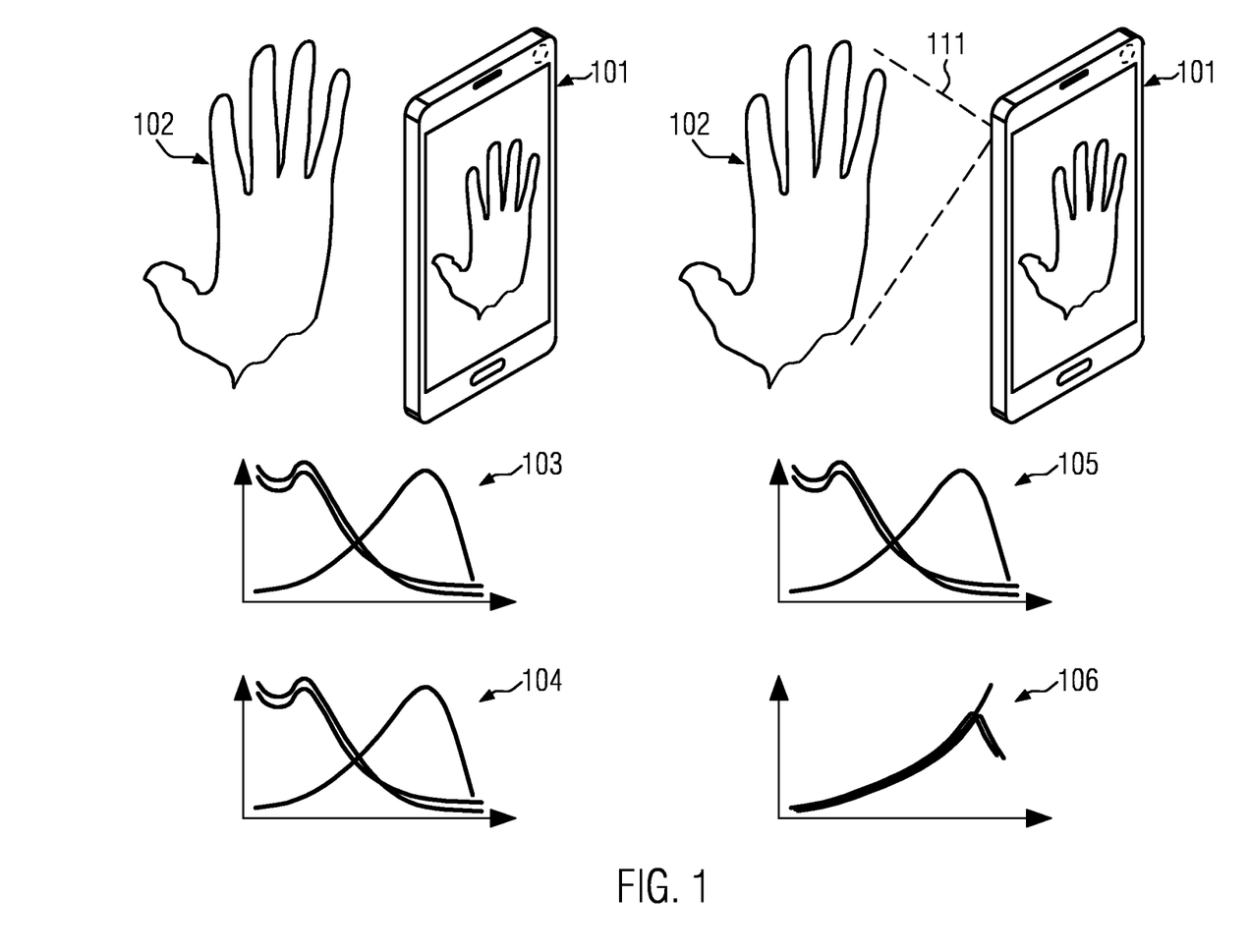
FIG. 1 shows a schematic depiction of taking images and corresponding brightness contributions, according to embodiments of the present disclosure.

FIG. 1 shows a schematic depiction of taking two images of an object. In the depiction of FIG. 1, there is provided a mobile computing device, like a smartphone, 101 that comprises an optical sensor (not shown separately) for taking images of scenes, for example of a hand 102 depicted here. It is clear that such a scene may also comprise some surroundings. For ease of explanation, however, these are not shown here.

When methods are employed to identify a user by taking an image of a body part of the user (like the face, the eye or the hand or the palm of the hand), it is necessary to know, for the subsequent identification step, whether the image taken actually is an image of the living body part or whether it is an image of a spoof of the living body part. Such a spoof could, for example, be an image obtained by a malicious user from the real person and held in front of the camera. If this image has sufficient quality, it could potentially spoof nowadays used identification mechanisms for biometric features and, thereby, access could be granted to sensitive information, like bank accounts, to an actually not authorized user by using this spoof of the real object.

According to the present disclosure, this can be prevented by taking more than a single image of the potentially real object (as long as it is not known whether it is an image of the real object or only an image of the spoof of the object) and processing these images by neural networks as will be explained later.

In order to give this a more general context, the left side in FIG. 1 shows the mobile computing device, like the smart phone, 101 taking an image of the potentially real object 102, in this case a hand. Under normal conditions, this will in any case result in a brightness distribution as depicted in the diagrams 103 and 104. This brightness distribution is not necessarily the brightness distribution that will be obtained under any potential lighting conditions but only is an exemplary diagram showing lighting conditions of an object for which an image is taken without a light (e.g., a flashlight) of the mobile computing device (or any other suitable illumination source) being activated. From this alone, it cannot be determined whether the image is from a living object or a spoof of the living object.

The right side of FIG. 1 then shows the same scene where, this time, the image is taken with the illumination source of the mobile computing device 101 being activated and illuminating the scene with light 111.

The diagrams 105 and 106 show the light distribution in the different color channels (like red, blue and green) and the respective brightness values for this situation.

It is clearly seen that the diagram 105 mirrors the diagrams 103 and 104 whereas the diagram 106 is clearly distinct from the original diagram 104.

It is a finding of the present disclosure that a significant difference in the brightness distribution over the respective color values in an image is obtained if the image is an image of the real object, i.e., the hand 102 is in fact the real hand of a human being. In contrast to this, a spoof of such a real object, specifically a spoof in the form of an image of the real object being held in front of the camera in the scenes in FIG. 1 will result in diagrams 103 and 105 where there is only, if at all, minor differences between the image taken without an illumination source of the computing device being activated and an image being taken with the illumination device being activated.

This can be used to distinguish between situations where only a spoof of the real object is photographed and situations where the real object is photographed. However, the diagrams 103 to 106 strongly depend on the environmental conditions (backlight, background, distance of the object to the camera and the like) and can thus not be easily processed by a computing algorithm in order to make a corresponding decision regarding whether or not the images constitute images of real objects or spoofs of objects.

It is a finding of the present disclosure that a neural network that is specifically trained for processing corresponding first and second images taken of a single scene is more appropriate in order to make the respective decision with high accuracy, i.e., leading to few false positive and false negative results.

Figure 2:
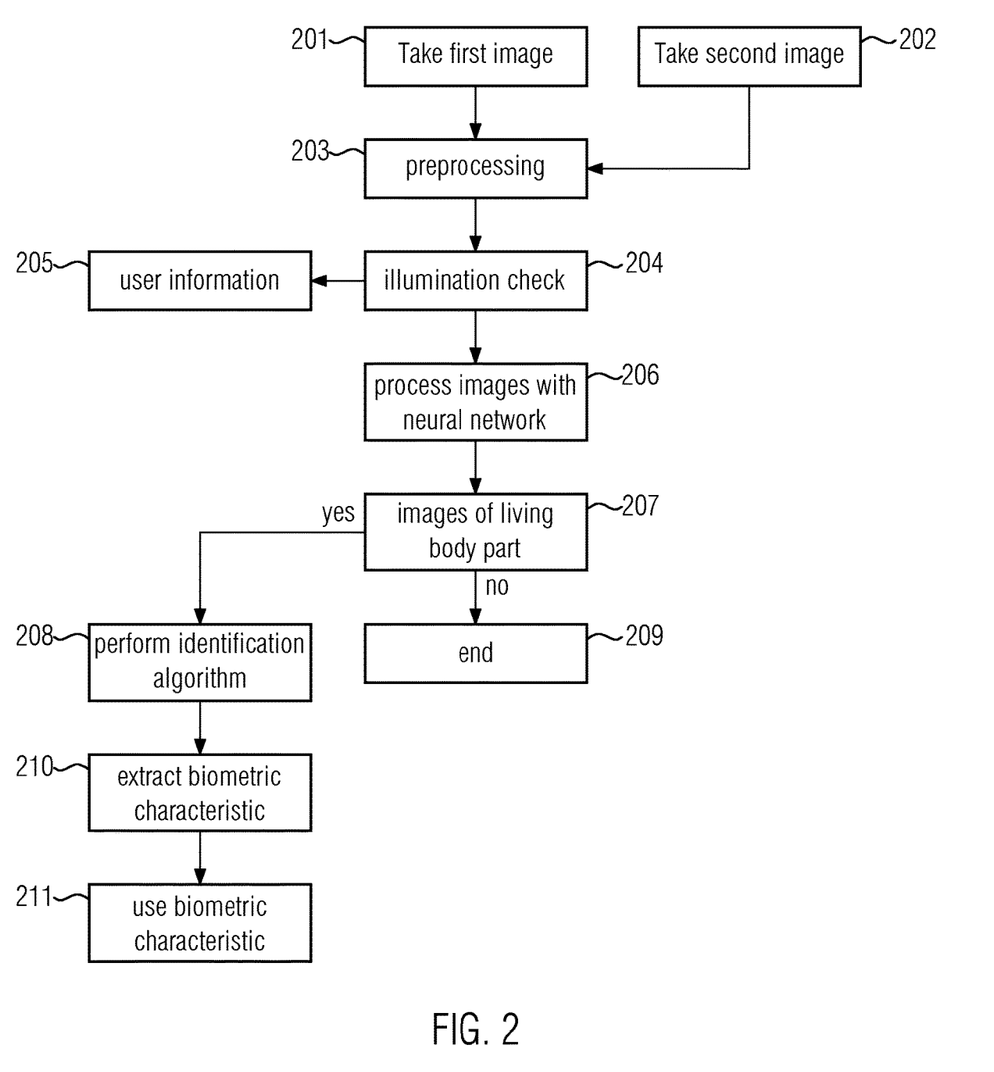
FIG. 2 shows a flowchart of a method according to one embodiment of the present disclosure.

FIG. 2 shows a schematic flow-diagram of a method according to the present disclosure for processing corresponding first and second images in order to make a respective decision whether or not the images taken are images of a real living body part or not.

In FIG. 2, in the first steps 201 and 202, the first and second images are taken. For the present disclosure, it is of no relevance whether the first image is the image that is taken with the illumination source being activated or whether it is the second image that is obtained with the illumination source being activated. What matters in the context of the present disclosure is that one of the images is taken with the illumination source being activated and the other one being taken without the illumination source being activated. Exemplary only, it will be assumed that the first image taken is taken without the illumination source being activated in step 201 and the second image taken in the step 202 is the image that is taken with the illumination source being activated. In view of this, it is clear that first and second images are taken one after the other. In order to avoid negative impacts on the evaluation of the images by changing conditions, the time between steps 101 and 102 should preferably be very small. Preferably, the time between taking the images is less than 1 s, preferably less than 0.5 s.

As already indicated above, the illumination source may, for example, be a light (e.g., a flashlight) of nowadays used by mobile computing devices like smartphones and tablet PCs but as potentially also are provided in laptops.

The two images taken in steps 101 and 102 can then be preprocessed in a step 203. This preprocessing can, for example, include some normalizing or other processing steps like reducing the original number of pixels taken in the first and second images to a specific number, like 256×256 pixels or separating portions of the images in order to process them further and discarding other portions of the images. The step 203 is, however, not mandatory and the process described in FIG. 2 can also be performed without applying any preprocessing to the first and second images. Further, it is also possible to only preprocess one of the images, e.g., the one taken with the illumination source being activated or the other one.

In a next also merely optional step 204, an illumination check may be performed. This illumination check may be performed by employing specific software that checks illumination conditions from the images taken (or even from a third image taken independent from the first and second images). Alternatively or in addition, specific hardware of the mobile device, like a smartphone, may be used. If the mobile device comprises (for example as part of a camera) a brightness sensor, information obtained from this brightness sensor may be used to perform the illumination check described below. The information from the brightness sensor may be obtained without having taken any image at all. Alternatively or in addition, the illumination check may be performed using the brightness sensor while the images are taken or after the images have been taken. Furthermore, a combination of obtaining information from the brightness sensor and employing software to perform the illumination check (for example based on the images taken) may be used in order to improve the results of the illumination check.

While, this illumination check is performed after the images have been taken, this illumination check can also be performed before the images are taken. The illumination check may comprise checking the surrounding brightness or illumination conditions in the environment, for example whether it is daylight, night or whether the person actually holding the mobile computing device or acting upon it in order to perform the method described in FIG. 2 is within a building with artificial light and the like. As already explained above, the brightness distributions actually obtained (see FIG. 1) strongly depend on the environmental conditions. If the illumination conditions in the surroundings are of such a kind that it is very likely that, if the two images are taken with one image being taken with the illumination source being activated and the other image being taken without the illumination source being activated, do not reasonably result in distinguishable brightness values (for example in the case that it is bright daylight) further performing the method according to FIG. 2 may not be reasonable as no reliable result can be obtained. In such a case, after having performed the illumination check 204, it can be determined that the method cannot be reasonably applied. In such a case, the method can be aborted and/or information can be provided to the user in the step 205, informing the user that the illumination conditions are not such that the identification method can be reliably performed. This can be determined for example based on a brightness value of the current illumination conditions. If this brightness value exceeds potentially preset threshold, the information can be sent in step 205 to the user and/or the method can be aborted.

If the illumination condition and the corresponding brightness value are below the respective threshold, the method can proceed with step 206 or, in case the illumination check 204 is performed before the first and second images are taken, the method could proceed with the steps 201 and 202.

In the next step, the images are processed by a neural network in order to determine whether the first image and the second image are images of a living body part or not.

In one embodiment of the present disclosure, this comprises processing the first and the second image by comparing, via the neural network, the images with respect to their pixel brightness distribution and obtaining, from this, a result that either indicates that the images are taken from the real object or not. This is determined by the neural network due to the fact that the neural network is specifically trained to make this decision. The pixel brightness contributions of the first image and the second image may be processed by the neural network and during this processing, the neural network processes each of the images (or both simultaneously) through its one or more layers, thereby obtaining a specific result. This result will be almost identical for the first and second image being taken if the images are taken from spoofs of the real object (see FIG. 1) and it will differ, as is also explained with respect to FIG. 1, if the images taken are images of the real object.

These differences will, however, not always be the same and it is, therefore, necessary to have a specifically trained neural network (as will be explained with respect to FIG. 3) that, depending on whether the images are images of real objects or not, will give a specific and well-defined result.

Specifically, it can be considered that each of the images, the first image and the second image are separated into their respective color values red, blue and green and/or are separated into the brightness distribution in the respective red, blue and green colors. From this, for each of the images, a median brightness value of the respective pixels can be obtained for each of the colors. From these median brightness values, it can then be determined whether the image that is taken with the illumination source being activated exceeds the median brightness values of the pixels of the image that has been taken without the illumination source being activated. If this is determined in a way that the median brightness value of the second image (the one taken with the illumination source being activated) exceeds the median brightness value of the first image by a specific threshold that indicates that the second and the first image are images taken from a living body part, the neural network can determine that the first and second images are images of the real object and not a spoof. If, however, the median brightness values do not differ at least by the above-described threshold, the determination can be in the negative and it can be determined that the first and second images are no images of the living body part.

More specifically, the pixel brightness distribution for each of the red, blue and green pixels can be obtained for the first image and the second image and the obtained pixel brightness distribution of each of the colors of the first image may be compared to the pixel brightness distribution of the corresponding color in the second image. This means that there is actually three comparison steps according to this embodiment of the present disclosure where the red brightness distribution of the first image is compared to the red brightness distribution in the second image and the green brightness distribution in the first image is compared to the green brightness distribution in the second image and the blue brightness distribution in the first image is compared to blue brightness distribution in the second image. This results in three basically independent determinations that can result in a more reliable evaluation of whether or not the first and the second images show the living body part or not.

For this processing, it can also be considered to apply, for example during the preprocessing 203, a step where the neural network or another correspondingly adapted neural network is used in order to separate a portion in the first and second image that most likely contains the body part of interest, for example the fingertip, from which, as a biometric characteristic, the fingerprint is to be extracted for further identification. In this case, this so-called "region of interest" ROI can be separated, for example during the preprocessing step and can then be processed further by the respective neural network.

While the above embodiment was described by reference to only a single neural network, it can also be thought of realizations where there is employed more than a single neural network to perform the respective steps.

Specifically, as explained above, before actually making the respective determination in comparing the values of the first image and the second image, information, like the brightness distribution, is obtained from each of the images. While the brightness information can be also obtained without using a neural network, other information might be more difficult to obtain from the images and might require employing a neural network. For this, a first "sub-network" can be employed to extract the respective information from the first image whereas a second "sub-network" is employed in order to obtain the respective information from the second image. The sub-networks are, of course, also neural networks that are specifically trained. More specifically, the first sub-network can be trained to obtain information from an image that is taken without an illumination source of the mobile computing device being activated, whereas the second sub-network is specifically adapted and trained in order to obtain corresponding information from an image that is taken with the illumination source of the computing device being activated.

As neural networks are usually trained using exemplary images of scenes that they should be able to identify, it is very well possible that the parameters of the respective neural networks (the first sub-network and the second sub-network) at least slightly differ which will result in a more accurate extraction of corresponding information from images for which the neural networks were trained.

A third sub-network (also a specifically trained neural network) may then be provided in order to perform the respective determination by comparing the information obtained from the first image and the information obtained from the second image, thereby determining whether the first and second images are images of the real living body part or not.

This determination can also comprise a more sophisticated determination where it is determined that the first and second images are either images of a living body part or it can also be decided whether the first and the second images are images on paper that are then photographed with the mobile computing device and/or whether the first and second images are images of images presented on the screen and/or whether the first and the second images are images of 3-D spoofs of living body parts (like for example silicone imitations). This determination is possible with a correspondingly trained neural network because each of the spoofs and also the actually living body part exhibits specific light reflection characteristics to which a neural network can be trained. The outcome of the respective determination would, in that case, not be "binary" in the sense that it either indicates that the images are images of spoofs or images of living body parts, but the outcome would be more complex in that also the kind of spoof would be identified.

In an alternative embodiment to the above-described cases, it can also be provided that not the first and second images are actually processed in the step 206 by an neural network but that, before processing by the neural network is actually performed, a difference image is obtained from the first and second image. This difference image may, for example, be obtained by a pixel-wise subtraction of the color values and/or brightness values of the first image and the second image. This can be performed by, for example, subtracting the red color value of the first image from the red color value of the second image and correspondingly for the other color values, for each of the pixels in the images. Additionally or alternatively, the corresponding brightness values may be subtracted for each of the pixels in the first image from the corresponding brightness values of the respective pixels in the second image. This results in a "difference image" having the same size as the first image and the second image but exhibiting only the differences in the brightness and/or color values. As it is those differences that contain the most significant information when attempting to identify whether the first image and the second image constitute images of the real objects or not, it is reasonable to make this determination before processing with the neural network is performed.

Having done so, it can also be provided in one embodiment of the present disclosure that, from this difference image, brightness difference information is obtained and this brightness difference information is then processed by the neural network in order to determine, from this brightness difference information, whether the first image and the second image are images of a living body part. This determination is basically obtained by the same processing as indicated above for the embodiment where the two images are compared to each other, but without requiring the actual comparison to be done by the neural network. This can have advantages with respect to the processing capabilities required by the computing device and the actual capabilities of the neural network, thereby making it easier to implement also on computing devices with less computing resources available and specifically on computing devices that do not have access to external computing resources like to external servers via a mobile internet connection.

For this embodiment, but also for the above-described embodiment where the two images are compared to each other, it can thus be provided that all the steps of the respective method are performed on the mobile device, which also holds for the steps described in the following. Thereby, the inventive method becomes advantageously applicable to situations where the user of the mobile computing device does not have access to external processing power. However, it can also be provided that not all steps of the method are performed on a mobile device but, for example, only the images are actually taken by the mobile device and are then forwarded to an external server that performs the further processing and then only provides the result of this processing back to the mobile device where, then, for example the identification of the user or the extraction of the biometric characteristic can be performed.

Irrespective of how step 206 is actually realized or where steps of the method are performed, the method will proceed with a step 207 where the determination is actually made whether the first and second images are images of a living body part or not. If they are not, the method can simply end in step 209 or information can be sent to some person, for example the person that would usually be identified with this biometric characteristic exhibited in the first and second images, providing to him information that someone wanted to get unallowed access to his sensitive information using spoofs of his biometric characteristic.

In the case where it is determined that the first and second images constitute images of a real body part, the method can proceed by extracting (step 210), from the images (if this was not already done during the preprocessing), the biometric characteristic. This can be done by, for example, separating a portion of the image containing the biometric characteristic, the so-called region of interest (ROI), from other portions of the image and only processing this portion of the image further, for example, extracting the minutia from the fingertips or extracting specific information from the face of the user or the iris of an eye of the user or the lines of the palm of the user.

Having extracted the biometric characteristic in step 210, the method can then proceed to an optional step 211 where the biometric characteristic extracted from the images is actually used. This using of the biometric characteristic can, for example, comprise identifying the user for which it has now been proven that the images used for providing the biometric characteristic show the real living body part of the user with his banking account or other sensitive and restricted access information.

Figure 3:
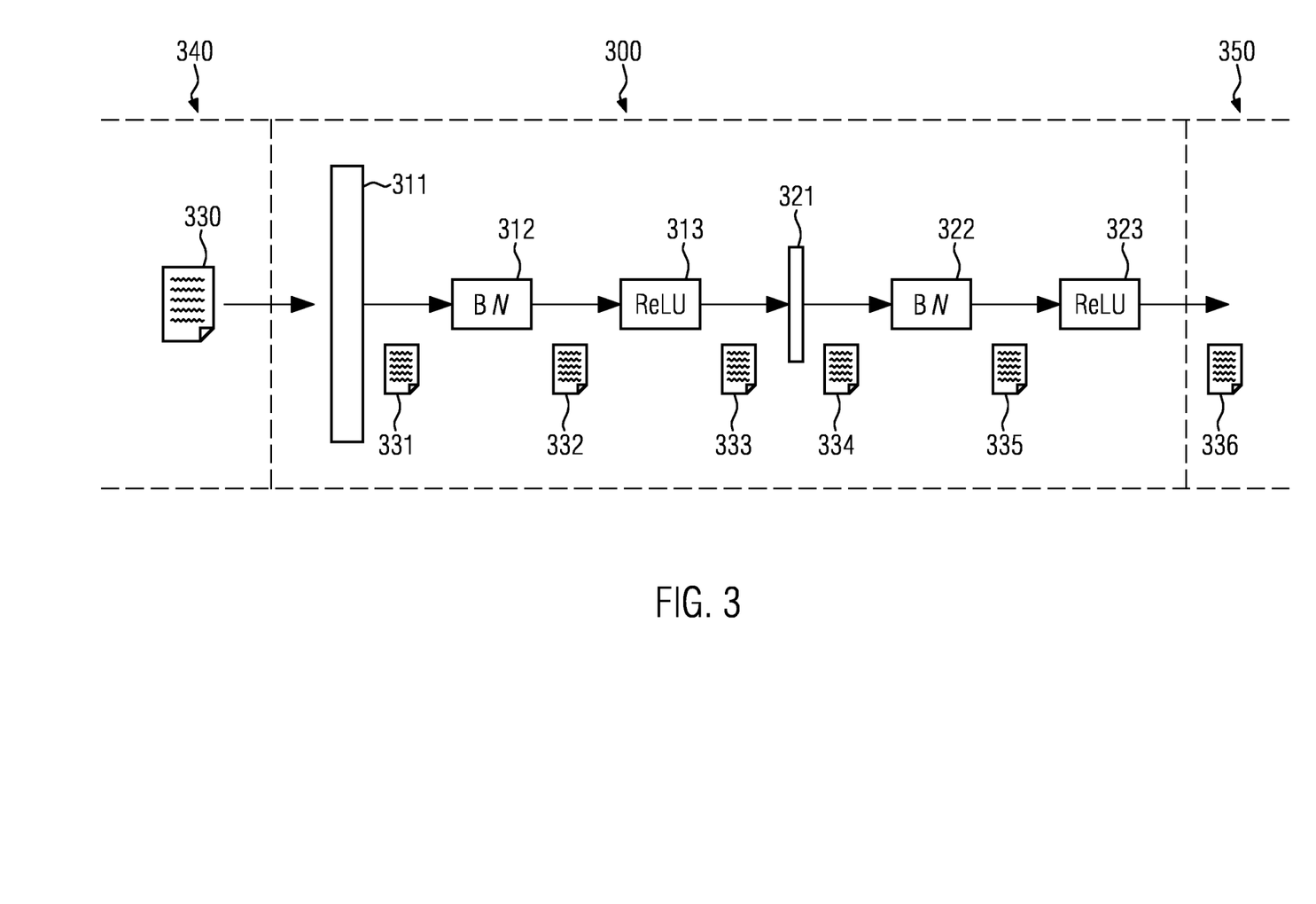
FIG. 3 shows a schematic depiction of how a neural network processes input according to one embodiment.

FIG. 3 shows the internal processing of a received input in one layer 300 of a neural network that can be employed for deciding whether or not an object on the two images is a living object or a spoof of a living object. According to one embodiment of the present disclosure, the network (which will also be referred to in the following) is a convolutional neural network (CNN). However, other networks may be used as well where the processing of the input to obtain an output is then depending on the specific structure of the used neural network.

The above mentioned layer 300 may be a layer that is, in processing order of the original input through the neural network, the first layer that receives the original input after, for example, some preprocessing. The input received may either be the two images or only a single image or the difference image as explained above.

In any case, the layer 300 will receive an input 330 that at least somehow corresponds to the originally obtained images or the difference image (or some preprocessed correspondence). This input is preferably provided in the form of at least one matrix that has the dimension N×M where N and M are integers greater than 0. The matrix may, for example, represent the pixels in the image for at least one color value (for example red) and/or corresponding brightness values. The entries in this matrix thus may have values that correspond to the value of the respective color (in the example case red) of this specific pixel and/or its brightness. As will be clear from the following, the input may not be identical to the obtained images or the difference image but can be a matrix P that was obtained from the matrix representing the original images or the difference image by some processing through preceding layers in the neural network or even by some pre-processing (for example reduction in resolution as explained above).

For ease of discussion, however, the input 330 will be assumed to correspond to the N×M matrix that represents at least one of the originally obtained images and each entry in this N×M matrix corresponds to a value of a color (for example red) of a pixel in the respective image. Applying this teaching to any other transformed matrix that originates from the original N×M matrix and is obtained through processing this matrix in layers of the neural network or to the case where (only) brightness values are provided for each pixel in the correspond matrix is straightforward.

Following now the process exemplified in FIG. 3, the input 330 is received by the depthwise convolutional layer 311 for processing. In the following, a comparably simple example will be given with respect to how the input matrix 330 can be processed by the depthwise convolutional layer. This will involve that a kernel K is used to calculate inner products with the matrix. The kernel is run over the matrix in so called "strides". While the following example will use values for horizontal and vertical stride widths of 1, any other value greater than 1 can be used as long as the stride widths are integers greater than 0. The kernel K is of size S×T, where S and T are integers and smaller than N and M.

Furthermore, it will be assumed that only the original input matrix I (i.e., the input matrix 330) of size N×M is used for calculating the inner product with the kernel. It is, however, also contemplated that an extended matrix Z can be used for calculating the inner products with the kernel. This extended matrix Z is obtained by "attaching", to the original matrix I, lines and rows above the first line and below the last line as well as left to the first row and right to the last row.

This is called "padding". The padding will usually comprise that a number $P_w$ of lines is added in the line direction and a number $P_h$ of rows is added to the row direction. The number $P_w$ can equal S−1 and the number $P_h$ can equal T−1, such that any inner product calculated between Z and the kernel contains at least one entry of the original matrix I. The resulting matrix Z will thus be of size $(N+2P_w) \times (M+2P_h)$. In view of this, the matrix Z will have the following entries:

$$Z_{cd} = \begin{cases} 0 \, \forall \, c \le P_w \\ 0 \, \forall \, c > P_w + N \\ 0 \, \forall \, d \le P_h \\ 0 \, \forall \, d > P_h + M \\ I_{ij} \text{ where } c = i + P_w; d = j + P_h; i = 1...N; j = 1...M \end{cases}$$

In this context, it follows that the new matrix obtained by calculating all inner products and arranging them properly according to lines and rows will generally be of size $$\left(\frac{N-S+2P_w}{W_w}+1\right) \times \left(\frac{M-T+2P_h}{W_h}+1\right),$$

where $W_w$ and $W_h$ define the stride width in the direction of the lines and the direction of the rows, respectively. It is clear that only those paddings and those stride widths are allowed for a given kernel K with size S×T that result in integers for the size of the new matrix. Furthermore, the stride widths $W_w$ and $W_h$ are preferably smaller than S and T, respectively, as otherwise the kernel would be moved over the matrix I in a manner that some lines or rows of the original matrix are left out in calculating the new matrix.

For ease of discussion, it will be assumed in the following that no padding is provided to the original matrix I and the stride width is 1 for horizontal and vertical strides. Furthermore, it will be assumed that the kernel is a matrix with size S×S, i.e., the special case where S=T will be assumed. Applying the explanations given below to arbitrary padding and stride width as well as to any kernel size is straightforward with the teaching provided below. In the depthwise convolutional layer 311, the received input matrix 330 is used to form an inner product with the kernel K that has the size S×S where S<N, M. The inner product is calculated for each reduced matrix of the original N×M matrix where the reduced matrix is of size S×S and contains coherent entries in the original N×M matrix. For example, considering S=3, the first reduced matrix R of the N×M original matrix comprises the entries i=1,2,3; j=1,2,3 such that the reduced matrix (N×M)$_s$ is comprised of nine entries and the inner product with the kernel K is calculated which results in a single number. The next reduced matrix in the directions of the lines of the original N×M matrix is the matrix where i is increased by 1, such that the next matrix in this direction is constituted of the items in the original N×M matrix where i=2,3,4; j=1,2,3. This matrix may then be used for calculating the next inner product with the kernel. It is noted that the given example of the S×S matrix with S=3 is only one example and other kernels may also be used.

In order to calculate the next reduced matrix R of the size (N×M)$_s$ in the direction of the rows/columns, the index j of items in the original N×M matrix is increased by 1. This is done until the last reduced matrix in the direction of the lines where i=N−S+1, N−S+2, M−S+3 in the case for S=3. For the rows, this is done in a corresponding manner where j=M−S+1, M−S+2, M−S+3. By calculating those inner products, a new matrix, the matrix P is calculated that has the size (N−S+1)×(M−S+1). Its entries P$_{ij}$ correspond to the respective inner product calculated with the corresponding reduced matrix of the original N×M matrix and the kernel K. It is noted that a matrix of this size will, in fact, be forwarded to the pointwise convolutional layer of the layer 300.

The kernel K constitutes entries that are obtained through a learning process where the neural network is trained in order to properly identify the intended objects, in the case according to the present disclosure, in order to find out whether a living body part is shown in the respective images. The kernel K used in the layer 300 of the neural network is not necessarily identical in size and entries to the kernels used in other layers of the respective neural network. Additionally, the entries in the kernel do not need to be identical to each other but at least constitute numbers being larger or equal to 0. The entries may be considered to represent "weights" that are obtained through learning of the neural network.

The result of the processing of the matrix 330 by the depthwise convolutional layer is the matrix 331 having, as explained above, size (N−S+1)×(M−S+1) in case the kernel is moved in strides over the original N×M matrix that have a distance of Δi=1 in the direction of the lines Δj=1 in the direction of the rows. In case, however, those strides have a larger distance like Δi=2 or Δi=3 (and potentially, correspondingly for the rows), the dimension of the result 331 will change correspondingly as explained above.

In the further processing, this result 331 is forwarded to the first batch normalize 312 that follows in the processing order depicted with the arrows in FIG. 3 after the depthwise convolutional layer 311. Those components are provided in order to provide unintended damping of potentially relevant information by the processing of the images through the network and specifically through the kernel(s) used in the layer(s).

The batch normalizer attempts to normalize the received result matrix 331. This is achieved by calculating the sum over each of the entries in the (N−S+1)×(M−S+1) matrix and dividing it by the number of entries in the (N−S+1)×(M−S+1) matrix. The mean value V for the (N−S+1)×(M−S+1) (denoted as P in the following, with corresponding items P$_{ij}$ matrix is given as $$V = \frac{\Sigma_{ij} P_{ij}}{n \cdot m}$$

where n and m represent the number of lines and columns/rows in the N×M matrix or the number of lines and columns in the matrix P. The items P$_{ij}$ are the entries of the matrix P where a given item P$_{ij}$ is the element in the matrix in line i and column j.

The batch normalizer then calculates a reduced matrix P' by subtracting, from each entry P$_{ij}$ in the original matrix, the mean value V such that P'$_{ij}$=P$_{ij}$−V. Thereby, the values in the reduced matrix P' are normalized such that anomalies in the one or the other direction (extremely large values or extremely low values) are filtered out.

The result 332 created by the first batch normalizer 312 is a matrix still having (in the example given in FIG. 4) the size (N−S+1)×(M−S+1) since, until now, no further dimensional reduction of the matrix was performed.

The result 332 is then provided to the first rectified linear unit 313 that follows the first batch normalizer 312.

The rectified linear unit modifies each entry in the matrix 332 further by calculating new matrix entries $\overline{P}_{ij}$ where $$\overline{P}_{ij} = \begin{cases} 0 \ \forall \ P'_{ij} < 0 \\ P'_{ij} \ \forall \ P'_{ij} \geq 0 \end{cases}$$

This results in values that would be smaller than 0 after having passed the batch normalizer to be set to 0, thus having no further influence on the further processing in the depthwise convolutional layer that will be explained in the following. This means that, for example, color values that are below the mean value calculated in the batch normalizer are not considered further and only the values that at least correspond to the mean value V have influence on the outcome of the next step in the calculation.

The result 333 thus output by the first rectified linear unit 313 still is a matrix of shape/size (N−S+1)×(M−S+1) and this matrix is forwarded to the pointwise convolutional layer 321.

This pointwise convolutional layer 321 creates a result 334. This result 334 is created by the pointwise convolutional layer 321 by taking each entry in the (N−S+1)×(M−S+1) matrix 333 and multiplying this entry with a weight α. α preferably is a number that is greater than 0 in any case and this number is identical for each entry in the (N−S+1)×(M−S+1) matrix. The result 334 that is obtained from the pointwise convolutional layer 321 thus is a matrix having the same size (N−S+1)×(M−S+1) but where each entry is multiplied with the weight α.

The result 334 is then provided to the second batch normalizer 322 where it is normalized in the manner as explained for the first batch normalizer 312 and a normalized matrix P' of the same dimension as the result 335 is calculated and this matrix/result 335 is forwarded to the second rectified linear unit 323 where a rectification function is applied to obtain a result/matrix $\overline{P}$ 236 that is then forwarded to the next layer in the neural network or, if no other layer follows in the neural network, the result 336 is provided as an output.

The outcome of the processing of the input images then allows for making a decision whether or not the input images constitute images of a living body part (this will be found during the processing of the images or the difference image because of the different behavior of living body parts to illumination with the light of the illumination source) or not, i.e., are spoofs of a living body part. Depending on how sophisticated the used neural network is, a further distinction may be made regarding what kind of spoof actually is used.

Figure 4:
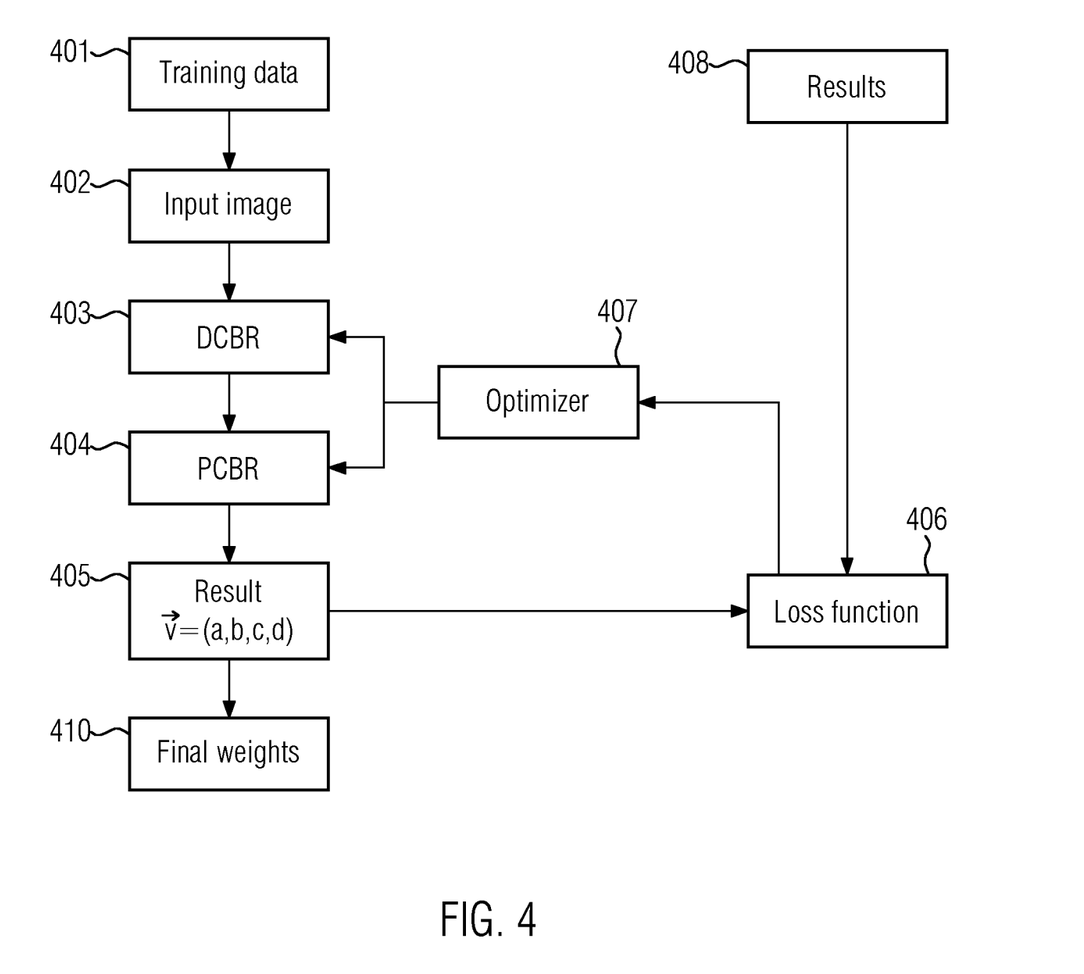
FIG. 4 shows one embodiment of training the neural network.

In FIG. 4, and explanation will now be given how the neural network can be properly trained such that the weights of the kernel K and the weight a explained with respect to FIG. 3 as well as the patterns that indeed allow for determining that the two images are showing real living body parts or only spoofs of the same are learned by the neural network.

The method of FIG. 4 begins with the provision of training data 401. The training data may be constituted by a plurality of images of, for example, fingertips or a plurality of fingers depicted in one image together with other objects. Further, the training data will contain images of real fingers/ other living body parts and images that show spoofs of such living body parts, for example images of images of fingers. Additionally or alternatively, the training data may comprise difference images as discussed above for being processed by the neural network.

The images may be multiplied by using, from the same image, rotated, highlighted, darkened, enlarged or otherwise modified copies that are introduced as training data.

Moreover, results 408 corresponding to the input will be provided where those results are the results the neural network should obtain and are, therefore, used in the learning to check the results of the processing by the neural network against the real results and to adjust the parameters of the neural network accordingly.

In the next step, one specific input image 402 is provided to the neural network in a training environment where, in addition to the neural network, an optimizer 407 and a loss function calculator 406 are provided.

The input image (or pair of images) is, in a first round, processed using the depthwise convolutional layer and the first batch normalizer as well as the first rectified linear unit 403, summarized as DCBR, and is then transferred to the pointwise convolutional layer, the second batch normalizer and the second rectified linear unit, summarized as PCBR, where they are processed in line with the description given in FIG. 3. This means the steps or the sections 403 and 404 depicted in FIG. 4 are run through using, in each section 403 and 404 the corresponding weights for the pointwise convolutional layer (PC) and the kernel K of the depthwise convolutional layer (DC). The first and second batch normalizers as well as the rectified linear units of items 403 and 404 work in the manner as explained above with respect to FIG. 3.

As a result, in line with FIG. 3, an output will be provided. The output may have the form of a vector $\vec{v}=(a, b, c, d, \ldots )$ where a, b, c, d may represent real numbers where $0 \le a, b, c, d \le 1$ and each of a, b, c, d represents a likelihood that the input represents either a real living body part (for example value a) or a spoof of such living body part (values b, c and d, where each of b, c and d represents the likelihood for a different kind of spoof). Instead of 4 such values, more or less could be provided. It can also be provided that only one output value is produced that indicates (for example if it is smaller than 1) that the images show a real living body part and (for example if it is larger than 1) that the images show spoofs of a living body part.

This result 405 will then be provided to the loss function where it will be compared with the results 408 in order to identify the differences between the result 405 and the correct result 408. This difference obtained by the loss function 406 is then provided to the optimizer 407 which, in turn, will modify the weights of each pointwise convolutional layer and each depthwise convolutional layer, i.e., a and the entries in the kernel K. This means that, either for all layers in the network at once or for each layer in isolation, the weight a of the pointwise convolutional layer and the entries in the kernel K of the depthwise convolutional layer are manipulated.

With those new values, the cycle is repeated for the very same image(s) and the resulting vector $\vec{v}=(a, b, c, d, \ldots )$ is provided to the loss function and compared to the correct results 408, the result of which being then provided to the optimizer 407 which, once again, modifies the weights.

This procedure is performed as long as the difference between the resulting vector $\vec{v}^{(n)}$ and specifically the made determination whether the images show real living body parts or spoofs of the same compared to the results 408 exceed a given threshold which, in essence, corresponds to the identification accuracy that is intended.

After that, the next input image(s) 402 is/are taken from the training data 401 and the corresponding bounding boxes are provided to the loss function. Then, the process explained is repeated again for the new image and the optimal weights for the pointwise convolutional layer and the depthwise convolutional layer are obtained. This is repeated until a specific combination of weights results in appropriate identification accuracy for all input images. The combination of weights that is then obtained is output as final weights 410.

These final weights are then introduced into the application that executes the inventive method on the mobile device.

Therefore, in the concept of the present disclosure, the neural network that is provided to the mobile device is already fully adapted to the identification of images of living body parts and spoofs of such living body parts and can thus be employed without any further learning being required which further reduces the computer resources required at the mobile devices.

In total, by using the pointwise convolutional layers, the depthwise convolutional layers and the batch normalizers as well as the rectified linear units as explained above with reference to the above figures and embodiments, an application can be provided that is small in size, thus allowing for utilization on a mobile device in isolation even without any access to additional data sources via the internet or the like. This makes it suitable for application in environments where no access to wireless networks or the like is possible. Additionally, the processor power required for running this application is reduced to a minimum while still yielding appropriate spoof detection results, allowing to extract the biometric characteristics of the living body parts from confirmed (i.e., no spoofed) images that can then be used for later on performed identification of the user by the biometric characteristics, as explained previously.

Figure 5:
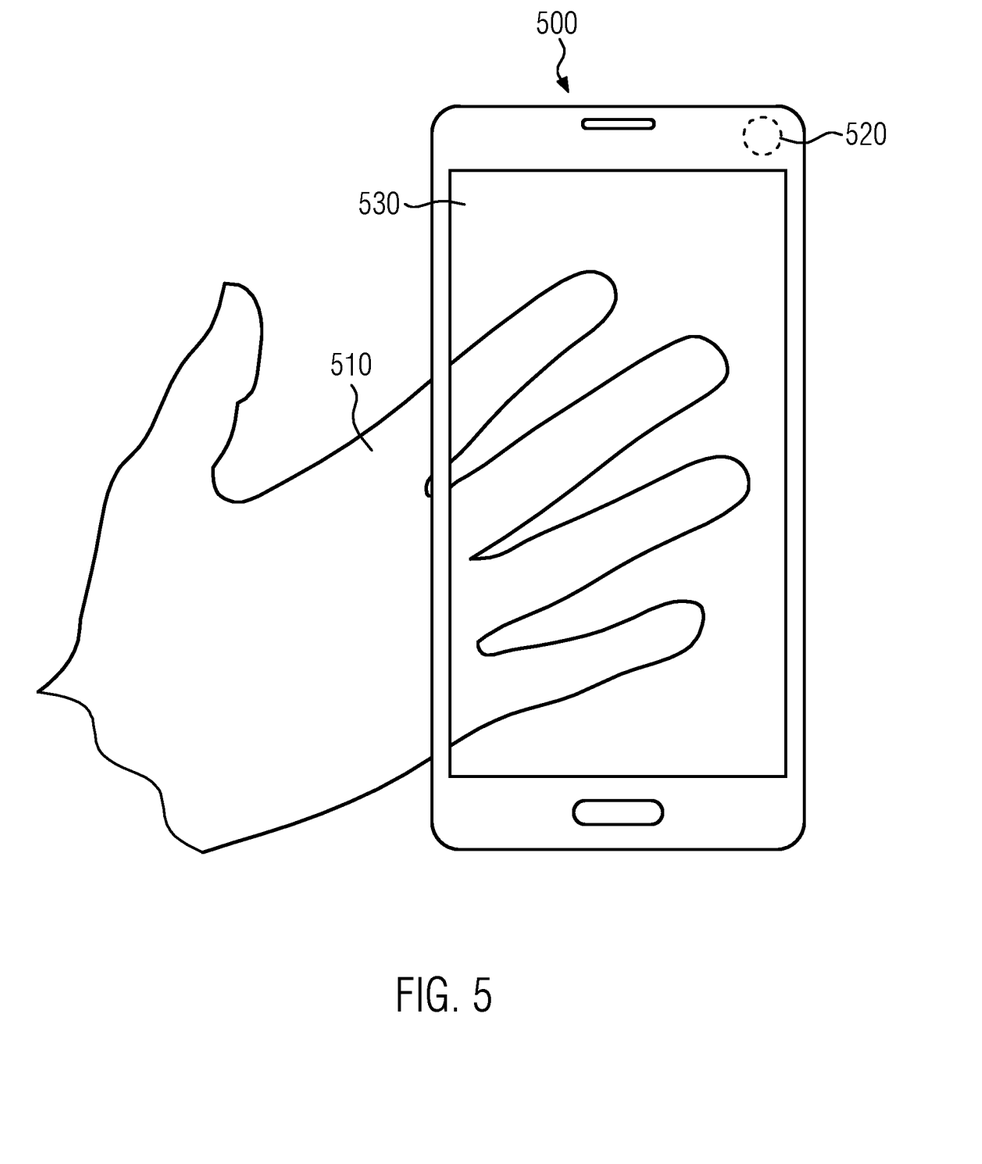
FIG. 5 shows an exemplary mobile device for performing the inventive method.

In order to give a context where the inventive method can be carried out, FIG. 5 depicts a mobile device in the form of a smartphone according to one embodiment of the present disclosure.

The mobile device 500 is embodied as a smartphone as is presently known. It comprises an optical sensor 520 (for example a camera) preferably on the backside of the mobile device which is opposite to the side of the mobile device 500 on which the display 530 is provided. According to the present disclosure, an illumination source (for example as part of the optical sensor 520) is provided that can selectively be activated and deactivated.

The camera can be a camera having a resolution of 1 MP, 2 MP or even more, thus, for example an HD camera. It can be provided with a flashlight as illumination source, but the present disclosure is not limited in this regard and any reasonable illumination source of such a mobile device may be used. It can also be adapted to take real-time images with a reduced resolution and once the camera is activated, the display 530 may show a representation of what the camera actually "sees". This can be, for example, a hand 510.

In one embodiment of the present disclosure, once the inventive method is carried out for taken images, the result of the determination may be shown on the display (not shown here).

The invention claimed is:

1. A computer-implemented method for identifying a user comprising:
   taking, by a computing device, a first image of a scene potentially comprising a living body part carrying a biometric characteristic, wherein the computing device comprises an illumination source that, when activated, emits visible light, and wherein the first image is taken without the illumination source activated;
   taking a second image of the scene potentially comprising the living body part carrying the biometric characteristic, wherein the second image is taken with the illumination source activated;
   transferring the first image and the second image to a neural network, wherein the neural network comprises a plurality of sub-networks, wherein a first sub-network of the plurality of sub-networks processes the first image to extract first information from the first image, wherein a second sub-network of the plurality of sub-networks processes the second image to extract second information from the second image, wherein a third sub-network of the plurality of sub-networks compares the first information and the second information to determine whether the first image and the second image are images of the living body part;
   processing, by the neural network, the first image and the second image, wherein the processing comprises:
      comparing the first image and the second image; and
      determining, based on the comparing, whether the first image and the second image are images of the living body part;
   responsive to determining that the first image and the second image are images of the living body part, performing an identification algorithm to identify the biometric characteristic for identifying the user; and
   responsive to determining that the first image and the second image are not images of the living body part, not performing the identification algorithm.

2. The method of claim 1, wherein comparing the first image and the second image comprises comparing the first image and the second image with respect to a pixel brightness distribution of the first image and the second image.

3. The method of claim 2, wherein comparing the first image and the second image with respect to the pixel brightness distribution of the first image and the second image comprises:
   obtaining red, blue, and green median brightness values of pixels of the first image and of pixels of the second image; and
   responsive to determining that the median brightness values of the second image exceeds the median brightness values of the pixels of the first image by a predetermined threshold, determining that the first image and the second image are of the living body part.

4. The method of claim 3, further comprising:
   obtaining a first pixel brightness distribution for the red, blue and green pixels for the first image;
   obtaining a second pixel brightness distribution for the red, blue and green pixels for the second image; and
   comparing each color of the first pixel brightness distribution to the corresponding color of the second pixel brightness distribution.

5. The method of claim 1, wherein processing, by the neural network, the first image and the second image comprises:
   before comparing the first image and the second image, identifying, using the neural network, at least one of a first portion of the first image likely to contain a body part or a second portion of the second image likely to contain the body part;
   extracting at least one of: first pixel information from the first image corresponding to the first portion, or second pixel information from the second image corresponding to the second portion; and
   wherein the comparing comprises comparing the first pixel information from the first image and the second pixel information from the second image.

6. The method of claim 1, further comprising:
   determining a brightness corresponding to a current illumination condition; and
   responsive to determining that the brightness corresponding to the current illumination condition does not exceed a given threshold, taking the first image.

7. The method of claim 6, further comprising:
   responsive to determining that the brightness corresponding to the current illumination condition exceeds the given threshold, presenting, to the user, an information that the identification cannot be performed under the current illumination condition.

8. The method of claim 1, wherein the computing device is a mobile computing device and wherein the neural network is installed on the mobile computing device.

9. The method of claim 1, wherein determining whether the first image and the second image are images of the living body part comprises:
   determining at least one of: whether the first image and the second image are images of paper, whether the first image and the second image are images of 3D-spoofs of the living body part, or whether the first image and the second image are of living body parts.

10. The method of claim 1, wherein the illumination source is a light of the computing device.

11. A computer-implemented method for identifying a user comprising:
    taking, by a computing device, a first image of a scene potentially comprising a living body part carrying a biometric characteristic, wherein the computing device comprises an illumination source that, when activated, emits visible light, and wherein the first image is taken without the illumination source activated;
    taking a second image of the scene potentially comprising the living body part carrying the biometric characteristic, wherein the second image is taken with the illumination source activated;

obtaining, from the first image and the second image, a difference image;

transferring the second image to a neural network, wherein the neural network comprises a plurality of sub-networks, wherein a first sub-network of the plurality of sub-networks processes the first image to extract first information from the first image, wherein a second sub-network of the plurality of sub-networks processes the second image to extract second information from the second image, wherein a third sub-network of the plurality of sub-networks compares the first information and the second information to determine whether the first image and the second image are images of the living body part;

processing, by the neural network, the difference image, wherein the processing comprises:
  determining, from the difference image, brightness difference information; and
  determining, from the brightness difference information, whether the first image and the second image are images of the living body part;

responsive to determining that the first image and the second image are images of the living body part, performing an identification algorithm to identify the biometric characteristic for identifying the user; and responsive to determining that the first image and the second image are not images of the living body part, not performing the identification algorithm.

12. The method of claim 11, further comprising:
determining a brightness corresponding to a current illumination condition; and
responsive to determining that the brightness corresponding to the current illumination condition does not exceed a given threshold, taking the first image.

13. The method of claim 12, further comprising:
responsive to determining that the brightness corresponding to the current illumination condition exceeds the given threshold, presenting, to the user, an information that the identification cannot be performed under the current illumination condition.

14. The method of claim 11, wherein the computing device is a mobile computing device and wherein the neural network is installed on the mobile computing device.

15. The method of claim 11, wherein determining whether the first image and the second image are images of the living body part comprises:
determining at least one of: whether the first image and the second image are images of paper, whether the first image and the second image are images of 3D-spoofs of the living body part, or whether the first image and the second image are of living body parts.

16. The method of claim 11, wherein obtaining, from the first image and the second image, the difference image comprises:
obtaining the brightness difference information from a pixel-wise subtraction of brightness values of the first image and the second image.

17. The method of claim 11, wherein the illumination source is a light of the computing device.

18. A mobile computing device comprising a processor for executing instructions comprising:
taking, by the mobile computing device, a first image of a scene potentially comprising a living body part carrying a biometric characteristic, wherein the mobile computing device comprises an illumination source that, when activated, emits visible light, and wherein the first image is taken without the illumination source activated;

taking a second image of the scene potentially comprising the living body part carrying the biometric characteristic, wherein the second image is taken with the illumination source activated;

transferring the first image and the second image to a neural network, wherein the neural network comprises a plurality of sub-networks, wherein a first sub-network of the plurality of sub-networks processes the first image to extract first information from the first image, wherein a second sub-network of the plurality of sub-networks processes the second image to extract second information from the second image, wherein a third sub-network of the plurality of sub-networks compares the first information and the second information to determine whether the first image and the second image are images of the living body part;

processing, by the neural network, the first image and the second image, wherein the processing comprises:
  comparing the first image and the second image; and
  determining, based on the comparing, whether the first image and the second image are images of the living body part;

responsive to determining that the first image and the second image are images of the living body part, performing an identification algorithm to identify the biometric characteristic for identifying a user; and responsive to determining that the first image and the second image are not images of the living body part, not performing the identification algorithm.

19. The mobile computing device of claim 18, wherein comparing the first image and the second image comprises comparing the first image and the second image with respect to a pixel brightness distribution of the first image and the second image, and wherein comparing the first image and the second image with respect to the pixel brightness distribution of the first image and the second image comprises:
obtaining red, blue, and green median brightness values of pixels of the first image and of pixels of the second image; and
responsive to determining that the median brightness values of the second image exceeds the median brightness values of the pixels of the first image by a predetermined threshold, determining that the first image and the second image are of the living body part.

* * * * *